United States Patent [19]

Kugel et al.

[11] Patent Number: 4,650,632
[45] Date of Patent: Mar. 17, 1987

[54] TOKAMAK PLASMA CURRENT DISRUPTION INFRARED CONTROL SYSTEM

[75] Inventors: Henry W. Kugel, Somerset; Michael Ulrickson, E. Windsor, both of N.J.

[73] Assignee: The United States of America as represented by the United States Department of Energy, Washington, D.C.

[21] Appl. No.: 600,664

[22] Filed: Apr. 16, 1984

[51] Int. Cl.[4] .............................................. G21B 1/00
[52] U.S. Cl. ................................................... 376/143
[58] Field of Search ................................ 376/143, 136

[56] References Cited

PUBLICATIONS

ORNL–FEDC–83/5, pp. 1–10.
PPPL–1988, 4/83, pp. 1–23.
Proc. 8th Symp. on Eng. Prob. of Fushion Research, 1979, Gardner et al., pp. 972–975.
J. of Nucl. Materials 111 & 112 (1982), pp. 130–136.
Proc. of 8th Symp. on Eng. Prob. of Fusion Research, 1979, Menon et al. pp. 656–660.
Nuclear Fushion, vol. 21, No. 2, 1981, pp. 233–249.
Nuclear Fushion, vol. 19, No. 19, 1979, pp. 1307–1317.
IAEA–CN–4YA–1, Johnson et al., pp. 1–25, 1982, vol. 1, No. 9.
PPPL–2041, 9/83, pp. 1–18, Ulrickson et al.
Proc. of 9th Symp. on Fushion Technology, 6/76, pp. 523–528, Goodall.
Nuclear Technology/Fushion, vol. 2, 10/82, pp. 712–722, Kugel et al.
PPPL–1932, 10/82, pp. 1–37, Fonck et al.
9th Symp. on Eng. Prob. of Fusion Research, vol. 2, 10/81, pp. 1071–1073, McMahon et al.

Primary Examiner—Harvey E. Behrend
Attorney, Agent, or Firm—Bruce R. Mansfield; Gustavo Siller, Jr.; Judson R. Hightower

[57] ABSTRACT

In a magnetic plasma confinment device having an inner toroidal limiter mounted on an inner wall of a plasma containment vessel, an arrangement is provided for monitoring vertical temperature profiles of the limiter. The temperature profiles are taken at brief time intervals, in a time scan fashion. The time scans of the vertical temperature profile are continuously monitored to detect the presence of a peaked temperature excursion, which, according to the present invention, is a precursor of a subsequent major plasma disruption. A fast scan of the temperature profile is made so as to provide a time interval in real time prior to the major plasma disruption, such that corrective action can be taken to reduce the harmful effects of the plasma disruption.

9 Claims, 8 Drawing Figures

TOKAMAK PLASMA CURRENT DISRUPTION INFRARED CONTROL SYSTEM

CONTRACTUAL ORIGIN OF THE INVENTION

The United States Government has rights in this invention pursuant to Contract No. DE-AC02-76CH03073 between the U. S. Department of Energy and Princeton University.

BACKGROUND OF THE INVENTION

This invention is directed to the diagnosis and detection of gross or macroinstabilities in a magnetically-confined fusion plasma device. Detection is performed in real time, and is prompt such that correction of the instability can be initiated in a timely fashion.

A plasma in a magnetic field has a tendency to be unstable; as a result, it can break up and escape from confinement by the field. Plasma instabilities are due basically to the presence of electrically charged particles; the electric and magnetic fields produced by their motions cause the particles to act in a collective, or cooperative manner. An example of such collective action is the drift of a plasma in a non-uniform magnetic field. Similar collective effects give rise to plasma instabilities. These instabilities fall into two broad categories, called "gross hydromagnetic instabilities" and "more localized microinstabilities". Suppose, for example, a small displacement of a plasma occurs in a magnetic field; if the system reacts in such a way as to restore the original condition, then it is stable. In the case of a hydromagnetic (or gross) instability, however, the plasma does not recover, but the displacement increases rapidly in magnitude. The whole plasma may then break up and escape even from a strong magnetic field.

Microinstabilities, as the name implies, are on a small scale compared with the dimensions of the plasma. As a rule, these instabilities do not lead to complete loss of confinement, but rather to an increase in the rate at which the plasma diffuses out of the magnetic field. This invention is directed to the former type of instabilities, the gross or macroinstabilities.

The term "plasma instability" refers to any cooperative plasma motion that can regenerate itself, starting from normal levels of random flunctuations or of plasma irregularities, in a time short compared to collision processes in the plasma. Thus, plasma instability can connote motions that range all the way from a gross motion of the plasma as a whole across a confining field, to high frequency, short-wavelength isolations of the plasma accompanied by intense flunctuating electric fields, but perhaps by little transport.

By their nature, gross instabilities are slow growing, that is their growth rate is much less than the ion cyclotron frequency, and involve wave lengths that are generally large compared to particle orbit diameters. They owe their origin to a simple circumstance: if a magnetically confined plasma can convert some of its internal kinetic energy to a directed motion by distorting or moving in some direction across the confining field, this process will occur. Though they are slow growing, compared to fine-scale instabilities, the effects of gross instabilities on confinement are the most catastrophic of all. Their growth time scale is of the order of the transit time of an ion through the confinement chamber—i.e., of the order of microseconds in fusion plasmas situations.

This invention is directed to disruptive instabilities which are characterized by a sudden, large disturbance that develops very rapidly (typically tens to hundreds of microseconds in ohmically heated plasmas), and is accompanied by hard x-ray bursts, flattening of a current profile with expulsion of poloidal flux and prominent negative voltage spikes, loss of energy, and shift of the plasma column to smaller major radius. Small disruptions may repeat several times; large ones may terminate the discharge.

Major plasma disruptions present a formidable design problem because of the rapid release of both thermal and magnetic energy. In general, disruptions are expected to occur at the limits of operation in current and/or density, but the mapping of an essentially disruption-free operating machine has been an empirical exercise for each device.

The design impact of a sudden loss of confinement is severe. Indeed, for all large tokamaks, major disruptions play an important role in first wall design. References which describe the engineering overdesign required by the occurrence of plasma current disruptions in Tokamaks are: "Mechanical Engineering Aspects of TFTR, J. C. Citrolo, Princeton Plasma Physics Laboratory Report No. PPPL-1988 [983], and Engineering Aspects of Disruption Current Decay", J. G. Murray, ORNL/FEDC-83/S(1983). Major disruptions also play a significant role in determining the requirements for vessel clean-out, plasma control, vertical field coil placement, and they even impact toroidal field coil design (when superconducting coils are employed). For example, a major disruption on a typical long pulse, d-t burning tokamak will cause the deposition of 100 to 200 MJ of plasma energy onto the surface of the first wall on a time scale short compared to the thermal diffusion time, so as to cause rapid heating and subsequent vaporization of substantial quantities (of the order of kilograms) of wall material.

It is obviously beneficial to provide a mechanism for control of major disruptions. In addition to the engineering advantages associated with the reduced thermal loading to the first wall and to the limiter, a reduction of severe JxB forces on coils, the prevention of the major disruption also allows lower q operation, which, if $\beta_p$ is limited by balooning, implies a higher beta operation. While some success has been achieved in disruption control, the techniques employed also present major design problems when examined in a reactor context.

It is therefore an object of the present invention to predict the occurrence of a major plasma disruption in real time, with enough advance lead time to allow corrective plasma control actions to be taken.

It is another object of the present invention to provide a plasma diagnostic technique which reveals plasma instability precursors, is easy to operate, and which can be implemented with a minimum-size system comprised of standard laboratory devices.

SUMMARY OF THE INVENTION

These and another objects of the present invention are provided for a magnetic plasma confinement device having an inner wall of a plasma containment vessel. An inner toroidal limiter is located on the inner wall of the vacuum vessel, and contact with the confined plasma is made during times of plasma disruptions. According to the invention, a time scan of a vertical temperature profile along the inner toroidal limiter is performed at brief intervals, using a time-scanning infrared camera or photodetector array. The time scans are continuously observed for the appearance of a peak temperature excursion. According to the present invention, the peaked temperature excursion is a precursor of a subsequent major plasma disruption. Having detected the peak temperature excursion, corrective action can be taken to lessen the deleterious effects of such disruption.

BRIEF DESCRIPTION OF THE DRAWINGS

In the drawings, wherein like elements are referenced alike.

DETAILED DESCRIPTION OF THE PREFERRED EMBODIMENT

The present invention will be described with reference to a particular magnetic confinement plasma device, the Poloidal Diverter experiment (PDX), located at Princeton University, Plasma Physics Laboratory. As will be appreciated by those skilled in the art, the present invention can be readily adapted to other applications.

Figure 1:
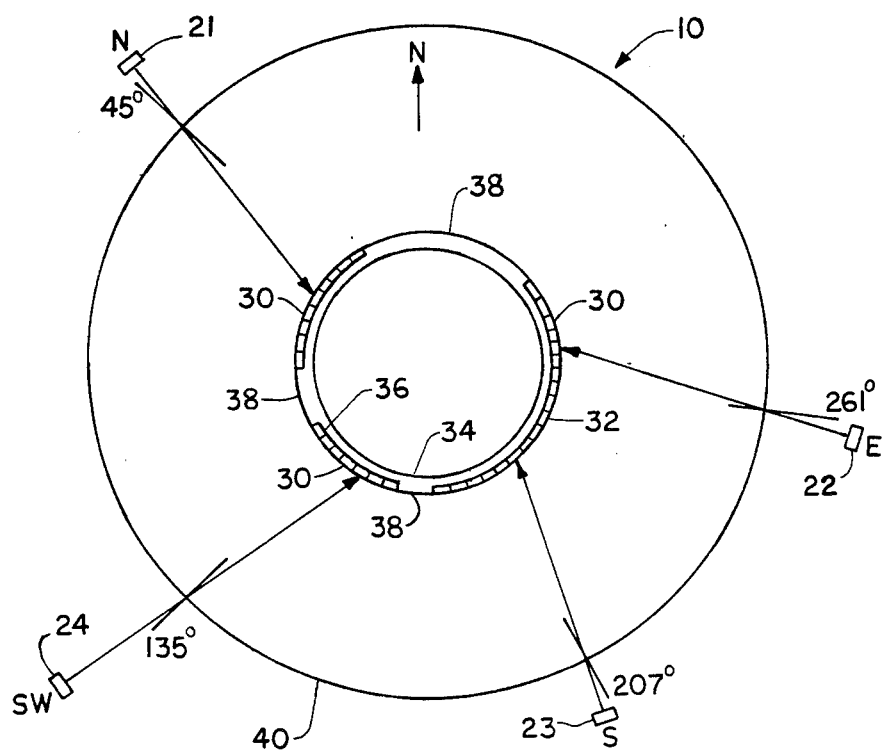
FIG. 1 is a partial schematic plan view of a magnetic plasma confinement device having an inner toroidal limiter arrangement.

The Poloidal Diverter experiment is being used to study impurity control and another significant processes in high-temperature neutral beam heated plasmas. With reference to the schematic plan view of FIG. 1, the PDX machine 10, a tokamak, has a toroidal vacuum vessel 12 for containing a magnetically-confined plasma. The plasma is heated by four neutral beam injectors, 21-24, as explained in the following references: W. L. Gartner et al, "Proceeding of the 8th Symposium on Engineering Problems of Fusion Research", San Francisco, Calif. 1979, (*IEEE*, N.Y, N.Y.) p. 972; M. M. Menon et al., also appearing in the "Proceeding of the 8th Symposium on Engineering Problems of Fusion Research", p. 656; and H. W. Kugel and M. Ulrickson "The Design of the PDX Tokamak Wall Armor and Inner Limiter System", American Nuclear Society, Nuclear Technology/Fusion, Vol. 2, October, 1982, pp. 712-722. The four beam lines inject a total heating power of 6 MW $H^0$ or 8 MW $D^0$. The injection is at a nearly perpendicular injection angle (9°). The measured neutral beam power density profile in the focal plane is almost axially symmetric and approximately Gaussian from the maximum power point to about 10% of maximum with a characteristic half-angle-at-1/e of 1.1° to 1.8°. The expected maximum power density on beam axis at the inner wall of the torus for a 300 millisecond injection is 3.2 kW/cm². Eventual 500 millisecond injection pulse lengths are anticipated. Incident power densities of this magnitude, for pulse durations up to 500 milliseconds, require the protection of the 0.95 cm thick 304 stainless steel inner wall of PDX. The adopted armor plate consists of arrays 30 of water cooled, titanium carbide coated graphite tiles 32, supported on inner wall 34 of the torus, opposite each beam port. Channels 36 formed in tiles 32 provide paths for coolant flow. Titanium plates 38 shield the gaps between the graphite units.

The PDX wall armor is designed to function as an inner wall thermal armor, a neutral beam power diagnostic, and a large area inner plasma limiter. The maximum PDX neutral beam power densities are capable of melting the surface of the 0.95 cm thick stainless steel-304 inner wall in about 250 milliseconds if injection occurs in the absence of a plasma, i.e., during conditions allowing essentially 100% power transmission to the inner wall. During normal operation with typical PDX plasma densities, beam transmission is approximately 10-30%, thus proportionally reducing the power density through the inner wall. However, if a disruption in the plasma current occurs during neutral beam injection, the transmitted power could increase to its maximum value. In principle, beam injection is terminated by a sense circuit approximately 10 milliseconds after the disappearance of the plasma current. However, the PDX armor is designed to accommodate this range of conditions and increase the margin of safety while adequately shielding the inner wall of the torus from full power for 0.5 seconds in the absence of the plasma.

Several systems are provided to study neutral beam heating in PDX, including the direct measurement of injected power or power density for a variety of beam and plasma conditions. These systems generally comprise an array of 64 thermocouples installed in the graphite tiles, and calibrated calorimeters installed in the water cooling lines 36 which cool the graphite tiles. Window ports on the outer wall 40 of the torus permit the use of IR cameras to monitor the front face temperature of the armor at regions of maximum power deposition. Such measurements provide a safety diagnostic for monitoring the integrity of the armor and also yield useful information on armor front face temperature profiles and effective heat transfer coefficients.

The PDX inner wall armor (i.e. array 30) is designed to also function as a plasma limiter. It has been estimated that a conventional poloidal rail inner limiter has a peak plasma thermal load of the order of 2 kW/cm² at mid-plane, whereas in an axisymmetric toroidal limiter, the peak plasma thermal load at mid-plane would be about 200 W/cm² (J. A. Schmidt, "Comments on Plasma Physics and Controlled Fusion" Vol. 5 (1980) p. 225. This substantially lower thermal load for a toroidal limiter is expected to provide a reduction in impurity emissions, and thermal fatigue. The PDX toroidal limiter configuration will contribute useful information concerning plasma and disruption thermal loads for a nearly axisymmetric limiter, impurity emissions, surface damage, mechanical stability, and overall reliability.

Access to the PDX vessel is obtained via 31 cm by 34 cm ports. This places a maximum size constraint on all armor components and installation procedures. The PDX plasma has a minor diverted radius of 47 cm and a major diverted radius of 145 cm. Undiverted dimensions are 57 cm and 145 cm, respectively. The toroidal radius of curvature of the PDX inner wall is 71.4 cm.

This relatively small radius of curvature requires armor segments of a comparable curvature or, equivalently, many narrow flat plates. However, practical constraints required the selection of a flat plane geometry of 9.93 cm front face width for the PDX armor design as a compromise between maximizing flat plate width in order to reduce the required total number of plates, and minimizing the amount of plate-edge exposure and protrusion beyond the mean armor radius as the plate width is increased. An armor length of 61 cm (or 30.5 cm above and below the mid-plane), was chosen to prevent protrusion beyond the shielding provided by the upper and lower inner limiters. The design tile length produced an approximately square tile shape, with an odd number of tiles per backing plate. An approximately square shape achieves a more symmetric thermal expansion, while an odd number of tiles was chosen to eliminate any gap at the mid plane where the neutral beam power is greatest. Each of the four armor units consists of three subunits containing either two or three backing plates, which provide mounting to inner wall 34. The graphite armor units cover approximately 70% of the circumference of the inner wall, and each graphite armor unit is positioned to intercept injected neutral beams. The 30% of the inner wall circumference that does not receive direct neutral beam power is armored with titanium plate which acts as an inner wall plasma calorimeter for measuring thermal loading during normal operations and disruptions in the plasma current. The armor is grounded to the PDX vessel which is electrically isolated during plasma shots.

Figure 3:
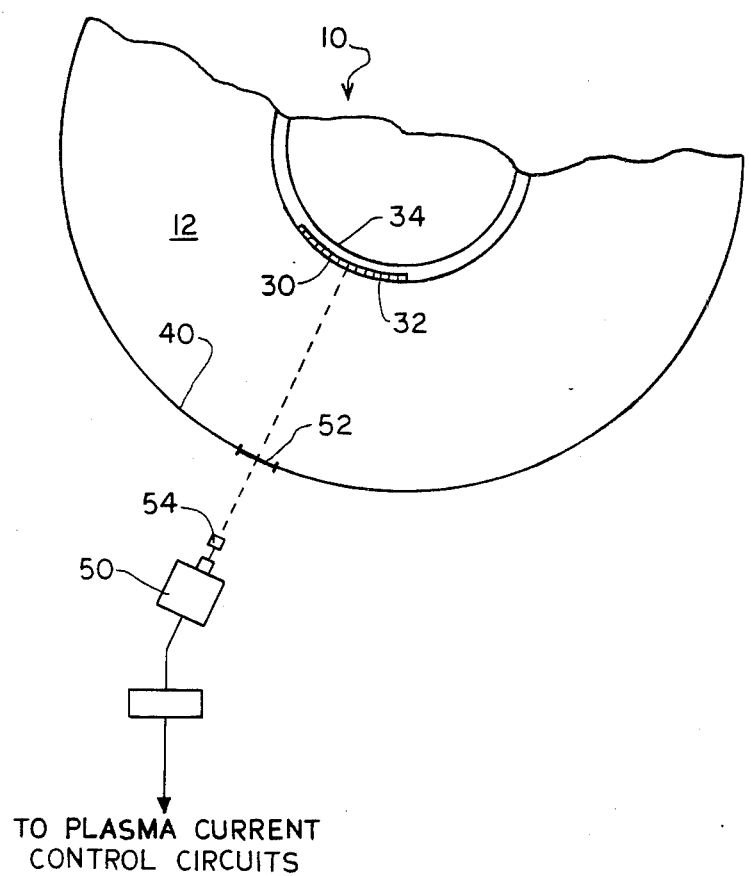
FIG. 3 is a partial schematic plan view showing a diagnostic arrangement employed in the present invention.

The following is a description of vertical temperature toroidal limiter, during both ohmic and neutral beam heated discharges. With reference to FIG. 3, the vertical temperature profiles along the graphite tile array 30 were taken with a scanning infrared camera 50 which views array 30 through a conventional high transmission Zinc Selenide infrared window 52 formed in outer wall 40 of device 10. Camera 50 is an Inframetrics Model 210 scanning infrared camera, which was positioned to view the limiter of array 30 from a distance of about 2 meters. The camera operates in two wavelengths ranges: 3 to 5 micrometers, and 8 to 12 micrometers. The camera was used in a line scan mode where temperatures along a single line are recorded. Since the camera used is designed for horizontal scanning operation only, a conventional 90° image rotator 54 (such as Inframetrics Model No. AC048) was employed upstream of the camera to facilitate vertical scanning of array 30. It will become immediately apparent to those skilled in the art, that an array of infrared photodiodes can be substituted for the infrared camera, if less stringent spatial resolution requirements are acceptable.

The time response of the system was about 125 microseconds, and a scan was taken every three milliseconds. The scans were archived using a computer data acquisition system. The camera and signal processing electronics were calibrated using standard black body sources. The emissivity of the limiter surface was detemined by uniformly heating the limiter by circulating warm water (approximately 50° C.) through the limiter cooling lines, and comparing the infrared signal to the limiter thermocouples. It was found that the emissivity was different for the two wavelength bands. The emissivity for the 3 to 5 micrometer band was 0.95 to 0.98 across the face of the limiter, while emissivity in the 8 to 12 micrometer band varied between 0.4 and 0.7. In view of the greater signal-to-background ratio obtained with the 3 to 5 micrometer band, and the relatively constant emissivity at these wavelengths, the results presented here were obtained using the 3 to 5 micrometer band. After the correction for emissivity, the temperatures determined from the two wavelength bands agreed to within plus or minus 10° C.

The measurements were performed during a period of extensive high beta plasma studies as described in "High-Beta Experiments with Neutral Beam Injection on PDX", D. Johnson et al, "Plasma Physics and Controlled Nuclear Fusion Research 1982" (Proceedings of the 9th International Conference, Baltimore, 1982) IAEA, Vienna, Vol. 1, No. 9 (1982). The temperature profiles measured on the inner toroidal limiter were obtained using both co-and-counter injection geometry. The discharges were typically initiated at the major radius and then brought into contact with the inner limiter. The inner toroidal limited plasmas had a major radius of 125 cm and a minor radius of 40 cm.

Figure 2:
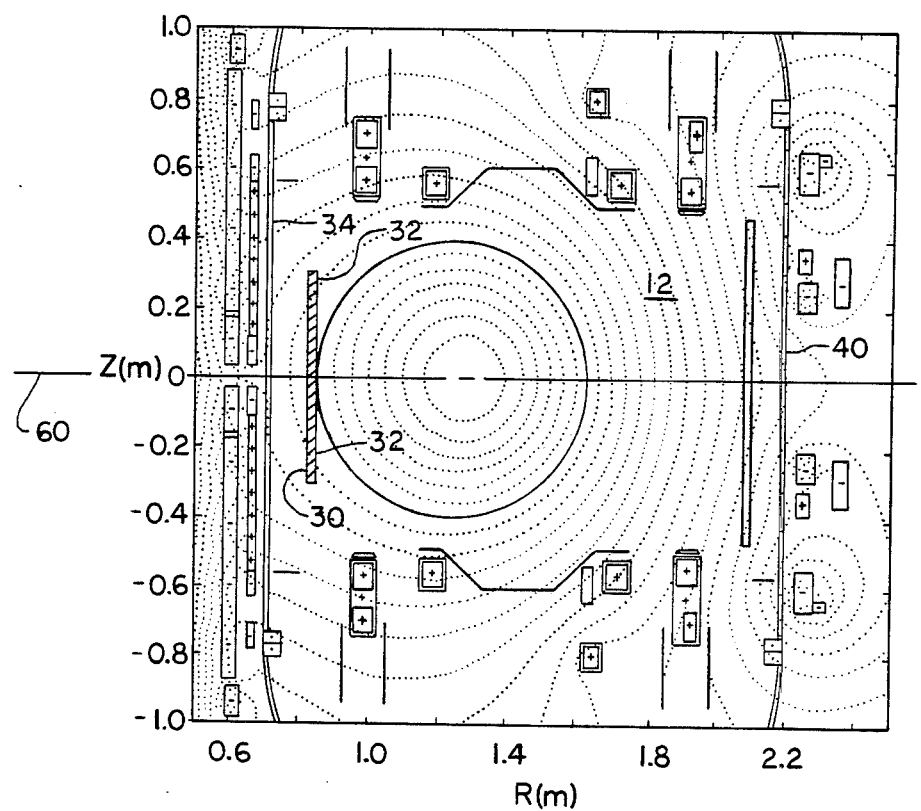
FIG. 2 is a schematic elevational view of the device of FIG. 1.
Figure 4:
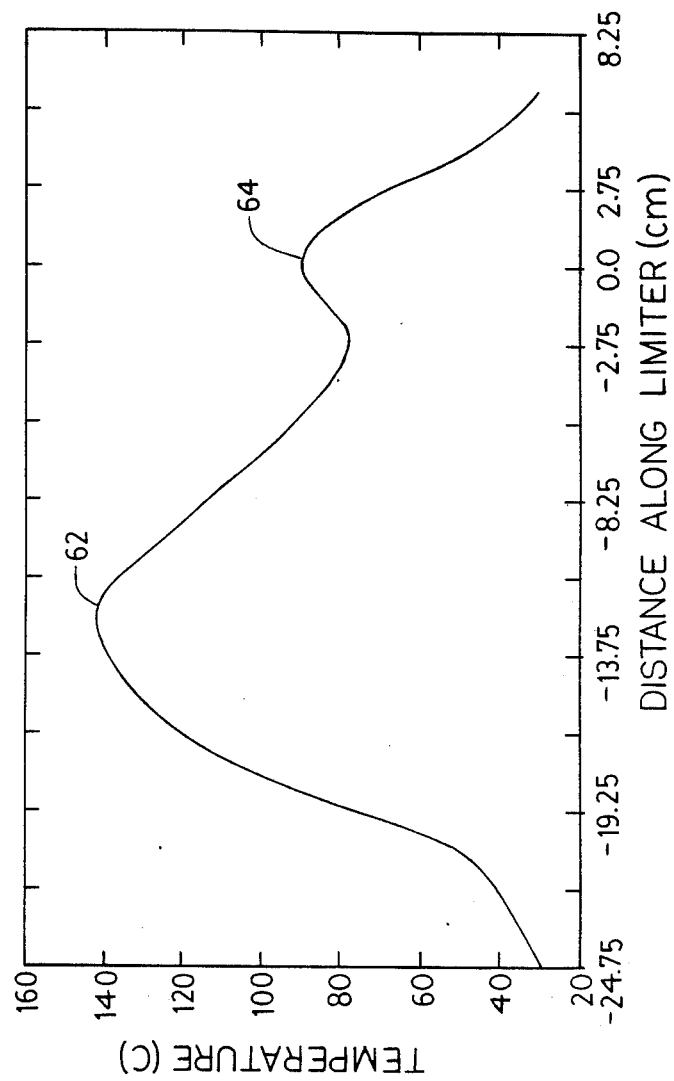
FIG. 4 shows a typical temperature profile following a neutral beam heated discharge in the arrangement of FIGS. 1-3.

FIG. 4 shows a typical vertical temperature profile following a beam heated discharge. A shift of the thermal pattern below the mid plane (see d=0 in FIG. 4, and line 60 in FIG. 2) is unexplained at this time. The asymmetry of the two peaks 62, 64 is tentatively presumed to be due to the directed momentum of the fast beam particles. The asymmetry is seen most strongly following neutral beam, as opposed to ohmic heating shots. The ratio of the thermal load in the two peaks is about 0.3. The temperatures are consistent with about 40% of the input power during the beam pulse going to the limiter.

Figure 5:
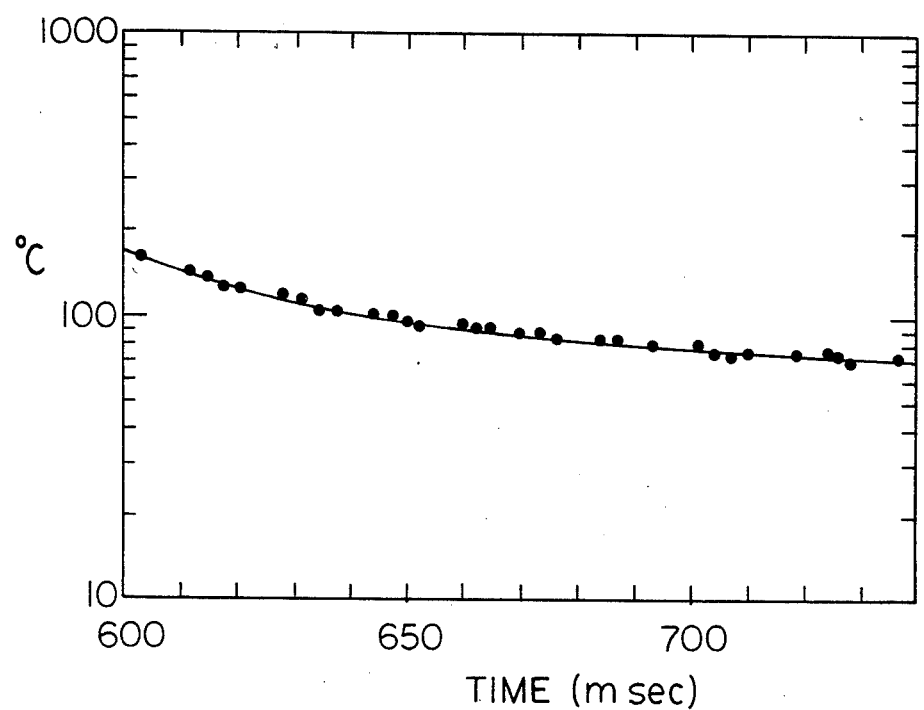
FIG. 5 shows a decay rate of temperature profiles following the neutral beam heated discharge of FIG. 4.

The decay rate for the temperature profiles following beam heated discharges is shown in FIG. 5. The dotted line is the result of a theoretical calculation of the limiter front face temperature using temperature dependent material parameters and a peak thermal load of 0.25 kW/cm$^2$ for 200 milliseconds. The thermal load was reduced from the temperature rise during the beam portion of the discharge. The time dependence of the power load during the beam could not be determined because of noise problems caused by the beam. The noise was due to electrical pickup and possibly beam heating of small bits of dust on the limiter surface resulting in small hot spots. It was observed that the predominant thermal load occurs during the beam portion of the discharge. This is consistent with the very small temperature rises observed during non-disruptive portions of ohmic heated discharges.

An array of 64 thermocouples mounted in the graphite tiles 32 was used to monitor the toroidal asymmetry of the thermal depositions. Data taken from the array show that the power deposition was toroidally symmetric except in those areas where there were inner wall diagnostic apertures. In these locations, power is deposited on the edge of the aperture and/or behind the limiter, resulting in slightly higher power deposition.

Measurements of ohmic heated discharges followed the beam-heated discharges described above. Typical plasma parameters include: toroidal magnetic field of approximately 12 kilogauss, $I_p$ between the 220 and 270 kilo-amperes, line average electron density 2.5 10$^{-13}$ cm$^{-3}$, and a magnetic safety factor (q) of 3.5.

Figure 6:
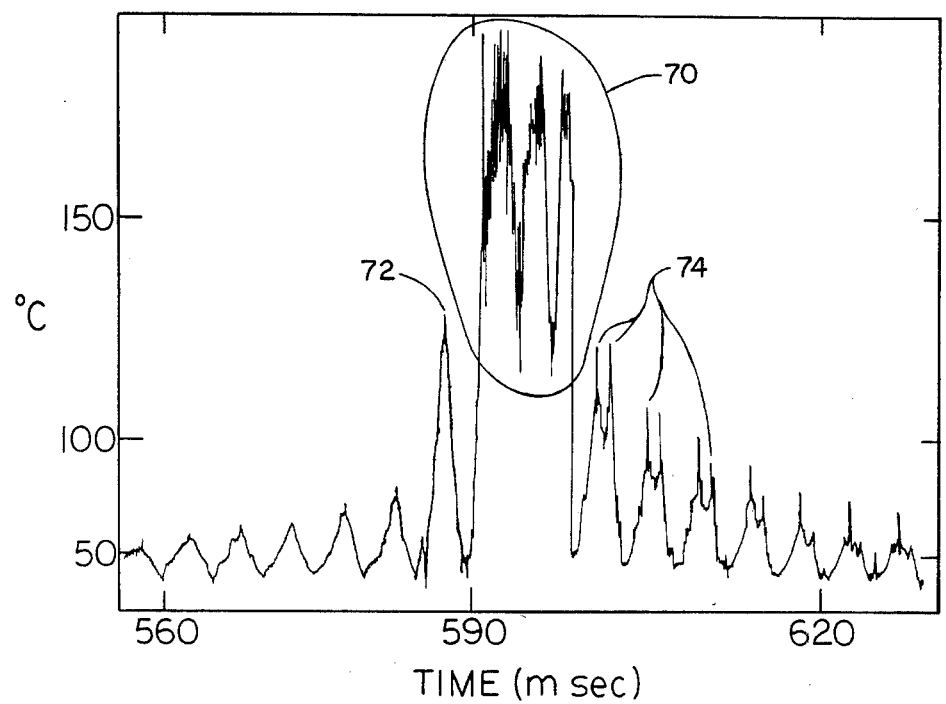
FIG. 6 shows a temperature profile sequence preceding and succeeding a disruption in an ohmic heated discharge.

FIG. 6 shows a typical temperature profile sequence preceding and following a major disruption 70 of an ohmic heated discharge. It was observed that a single heat precursor profile 72 appeared about 50 milliseconds prior to a major disruption 70, within an initial rate of rise of 2.4° C. per millisecond. The temperature of profile prior to the disruption could not be determined because the heat flux from the ohmically heated discharge was too small to cause measurable temperature differences across the graphite limiter. A series of inner wall temperature profile measurements were made over several hours of operation using sensitive thermocouples mounted on a titanium plate on the north-side of the limiter wall. Examination of these measurements revealed a double peak that occurred during normal ohmic heated discharges [a phenomenon reported by R. J. Fonck, et al, "Impurity Levels and Power Loading in the PDX Tokamak with High Power Neutral Beam Injection", "Plasma Surface Interactions in Controlled Fusion Devices, 1982", (Proceedings of the 5th International Conference, Gatlinburg, Tenn., June 1982), J. Nucl. Mater., 111 & 112, 343 (1982)]. Note also that the sequence of temperature profiles 74 following the disruption are double peaked and initially symmetrical.

Figure 7:
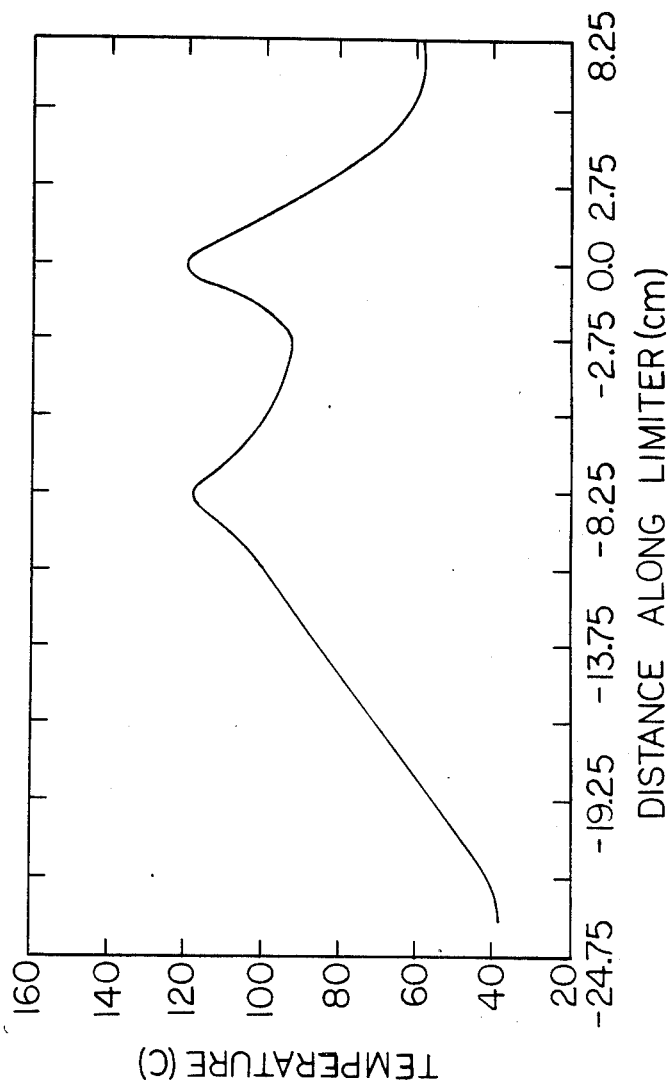
FIG. 7 shows a temperature profile following a disruption of an ohmic heated discharge.

FIG. 7 shows a typical temperature profile following a disruption in an ohmically heated discharge. The deposition is still shifted down by about the same amount as was found for the neutral beam heated discharges (see FIG. 4). Theoretical calculations of front-face tile temperature using temperature dependent material parameters and a thermal load of 5–10 kW/cm$^2$ for the 3–6 millisecond duration are consistent with observed temperatures. This load time is consistent with the measured plasma current decay rate of approximately 42 kiloamperes per millisecond. The temperature histories prior to the disruption indicate a thermal load of less than 20 W/cm$^2$.

Figure 8:
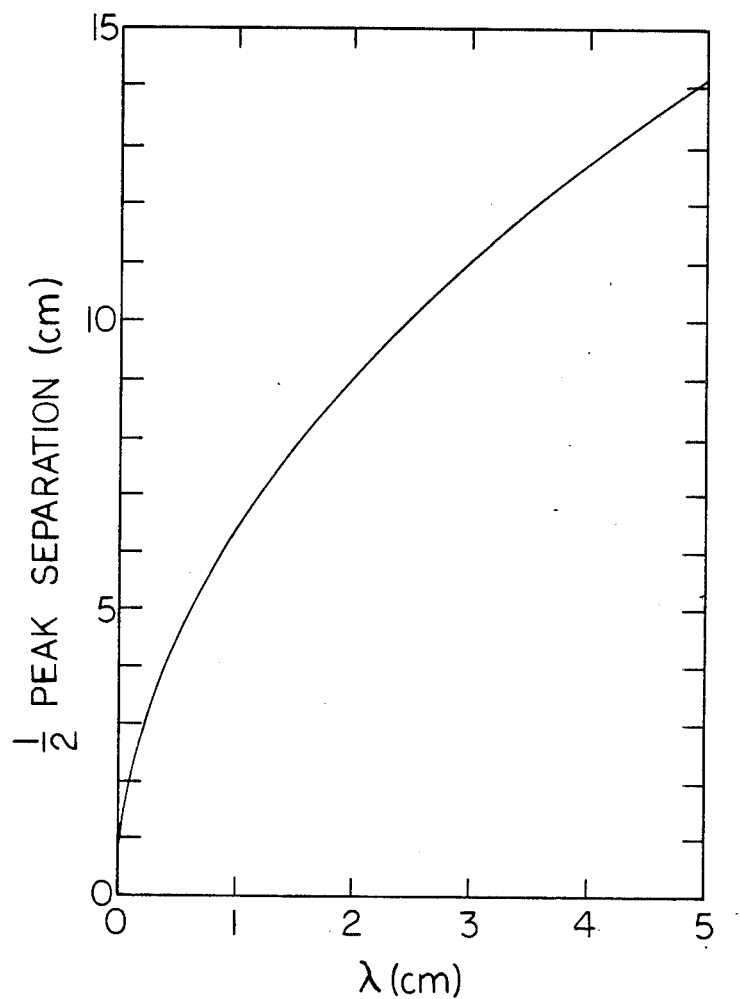
FIG. 8 shows a theoretical plot of peak separation versus scrape-off length for the toroidal limiter of FIGS. 1-3.

The Schmidt model for scrape-off of a toroidal limiter [J. A. Schmidt, "Tokamak Impurity-Control Techniques", "Comments on Plasma Physics and Controlled Fusion", Vol. 5, 225 (1980)] predicts a double peaked temperature profile. Using this model, the scrape-off length ($\lambda$) was derived as a function of the separation of the temperature peaks for the case of a flat, vertical, inner toroidal limiter. The results are shown in FIG. 8, a plot of one-half theoretical peak separation versus $\lambda$. The inferred scrape-off lengths are=1.0 cm for the neutral beam discharges and $\lambda$=0.5 cm for the postdisruption ohmic heated discharges. These values are consistent with other measurements made on PDX, as reported in "Interactions in Controlled Fusion Devices 1982" (Proc. 5th Intl. Conf. Gatlinburg, Tenn., June, 1982), J. Nucl. Mater., 111 & 112, 130 (1982). The observed symmetry in the toroidal direction is predicted by the model. A peak power load of 250 w/cm$^2$, deduced from the temperature profile, agrees with the peak power predicted by the model for 40% of the input power going to the limiter. The filling in of the valley between the peaks indicates the presence of a radial transport which is not included in the model in an explicit manner. While radial transport is implicitly included in the scrape-off thickness in the model, the power is assumed to flow only along field lines. This results in the power flux being predicted to be zero at the limiter plasma tangency point (midplane in the PDX case). The same radial transport which results in the scrape-off length will carry power to the tangency point, [according to S. A. Cohen, R. Budny, G. M. McCracken, M. Ulrickson, "Mechanisms Responsible for Topographical Changes in PLT Stainless-Steel and Graphite Limiters," J. Nucl. Fus. 21, 233 (1981)] and fill in the profile, as was observed. The lack of a double peak before disruption implies that the radial transport is greatly enhanced just prior to disruption. While it is true that enhanced radial transport will result in longer scrape-off lengths giving a wider peak separation, it will also result in more filling in of the space beween the peaks. Also, the longer scrape-off lengths result in lower peak power densities. Under such conditions, the radial transport to the tangency point can dominate the power flow. This could be particularly true if field lines are becoming stochastic prior to a disruption.

Those skilled in the art could implement various methods for automatically detecting the precursor peaks. For example, a simple method involves focusing several individual infrared photodiode detectors to view points on the surface of the inner limiter laying along a vertical line. A rapid increase in the signal strength from detectors viewing the midplane of the limiter relative to the signal strength of detectors viewing the outer edge of the limiter would indicate the presence of the disruption precursor. Either the relative rates of change in the respective signal strengths, the relative absolute differences in signal strength, or ratios of the signal strength between the respective detectors could be monitored for the disruption precursors. Indicators such as these could be introduced into a control feedback loop or used to trigger an electronic threshold to cause corrective control action to be taken. A more elaborate method, for example, involves using fast automatic data processing equipment to analyze the temperature profile detected with an array of individual detectors or a scanning camera system. The fast automatic data processing system could be programmed to recognize the characteristic disruption precursor pattern and adjust the tokamak operating parameters in a suitable manner to avoid the disruption or to reduce its severity.

Thus it can be seen that in those major plasma disruptions characterized by a temperature profile precursor, a fast infrared camera arranged according to the present invention can detect the precursor in time to provide a realtime interval before disruption, which allows ameliorating, or even fully corrective action to be taken. In the above example, the time interval prior to disruption was 50 msec. An example of corrective action that can be taken within this time is cited in "The Effect of Current Profile Evolution on Plasma-Limiter Interaction and the Energy Confinement Time", R. J. Hawryluk, et al., Nucl. Fusion Vol. 19 (1979) p. 1307, which describes an automatic control of operating parameters so as to optimize reactor performance and avoid the aforementioned deleterious effects of a plasma disruption. It is anticipated that other, more fully corrective measures, will be devised so as to sustain continuous operation despite potential plasma disruptions. The arrangement of the present invention can be employed to initiate such corrective action.

Another use of this invention is to detect the presence of so-called stationary mode plasma instabilities, i.e. plasma instabilities characterized by non-fluctuating, non-rotating, stationary magnetic structures in the plasma which are undetectable using the conventional magnetic sensing coils used to detect rapid fluctuations in magnetic structure.

The embodiment of the invention in which an exclusive property or privilege is claimed are defined as follows:

1. In a device for magnetically confining a plasma driven by a plasma current and contained within a toroidal vacuum chamber, the device having an inner toroidal limiter on an inside wall of said vacuum chamber, an arrangement for the rapid prediction and control in real time of a major plasma disruption, the arrangement including:

scanning means sensitive to infrared radiation emanating from within said vacuum chamber, said infrared radiation indicating the temperature along a vertical profile of said inner toroidal limiter, said scanning means arranged to observe said infrared radiation and to produce in response thereto an electrical scanning output signal representative of a time scan of temperature along said vertical profile;

detection means for analyzing said scanning output signal to detect a first peaked temperature excursion occuring along said profile of said inner toroidal limiter, and to produce a detection output signal in response thereto, said detection output signal indicating a real time prediction of a subsequent major plasma disruption; and plasma current reduction means for reducing said plasma current driving said plasma, in response to said detection output signal and in anticipation of a subsequent major plasma disruption.

2. The arrangement of claim 1 wherein said detection means comprises means for comparing a first scanning output signal taken at an outer edge of said limiter, and means for detecting a rapid increase in said first scanning output signal relative to said second scanning output signal and for producing said detection output signal in response to said rapid increase.

3. The arrangement of claim 1 wherein said detection means comprises means for comparing a first time rate of change of a first scanning output signal taken at a midplane of said limiter to a second time rate of change of a second scanning output signal taken at an outer edge of said limiter, and means for detecting a rapid increase in said first time rate of change relative to said second time rate of change, and for producing said detection output signal in response to said rapid increase.

4. The arrangement of claim 2 wherein said scanning means comprises an array of infrared photodetectors.

5. The arrangement of claim 2 wherein said scanning means comprises an infrared camera.

6. The arrangement of claim 3 wherein said scanning means comprises an array of infrared photodetectors.

7. The arrangement of claim 3 wherein said scanning means comprises an infrared camera.

8. The arrangement of claim 7 wherein said camera operates in the wavelength range of 3–5 micrometers.

9. The arrangement of claim 7 wherein said camera operates in the wavelength range of 8 to 12 micrometers.

* * * * *